US012220605B2

(12) United States Patent
Jungmair et al.

(10) Patent No.: US 12,220,605 B2
(45) Date of Patent: Feb. 11, 2025

(54) METHOD AND LIQUID MIXING SYSTEM FOR PROVIDING A LIQUID MIXTURE

(71) Applicant: Rosenbauer International AG, Leonding (AT)

(72) Inventors: Roland Jungmair, Buchkirchen (AT); Hannes Hammer, Katsdorf (AT)

(73) Assignee: Rosenbauer International AG, Leonding (AT)

( * ) Notice: Subject to any disclaimer, the term of this patent is extended or adjusted under 35 U.S.C. 154(b) by 467 days.

(21) Appl. No.: 17/454,978

(22) Filed: Nov. 15, 2021

(65) Prior Publication Data

US 2022/0072351 A1 Mar. 10, 2022

Related U.S. Application Data

(63) Continuation of application No. PCT/AT2020/060227, filed on Jun. 5, 2020.

(30) Foreign Application Priority Data

Jun. 6, 2019 (AT) ................................ A50514/2019

(51) Int. Cl.
*A62C 5/00* (2006.01)
*A62C 5/02* (2006.01)
(Continued)

(52) U.S. Cl.
CPC ................ *A62C 5/002* (2013.01); *A62C 5/02* (2013.01); *A62C 27/00* (2013.01); *B01F 25/105* (2022.01); *B01F 25/312* (2022.01)

(58) Field of Classification Search
CPC .............. A62C 5/002; A62C 5/02–027; A62C 99/0036
(Continued)

(56) References Cited

U.S. PATENT DOCUMENTS 4,324,294 A * 4/1982 McLoughlin ............ A62C 5/00 137/101.21
5,727,933 A * 3/1998 Laskaris .................. A62C 5/02 418/40
(Continued)

FOREIGN PATENT DOCUMENTS

AT 514927 A4 5/2015
AT 513994 B1 10/2015
(Continued)

OTHER PUBLICATIONS

International Search Report and Written Opinion for International Patent Application No. PCT/AT2020/060227 dated Oct. 12, 2020, 12 pages.
(Continued)

*Primary Examiner* — Cody J Lieuwen
(74) *Attorney, Agent, or Firm* — Stoel Rives LLP

(57) ABSTRACT

A method as well as a liquid mixing system for providing a liquid mixture of water with at least one additive. The liquid mixing system comprises a first water reservoir, a first additive reservoir, a mixing unit, a conveying device and a line network. At least one first measurement value of the flow of the first additive conveyed to a mixing device is determined by an additive flowmeter. The total stream of the liquid mixture conveyed by the conveying device is measured by a liquid mixture flowmeter. The determined measurement values are transmitted to a control device, and from there passed on to a data storage device where they are stored.

17 Claims, 2 Drawing Sheets

Figure 1:
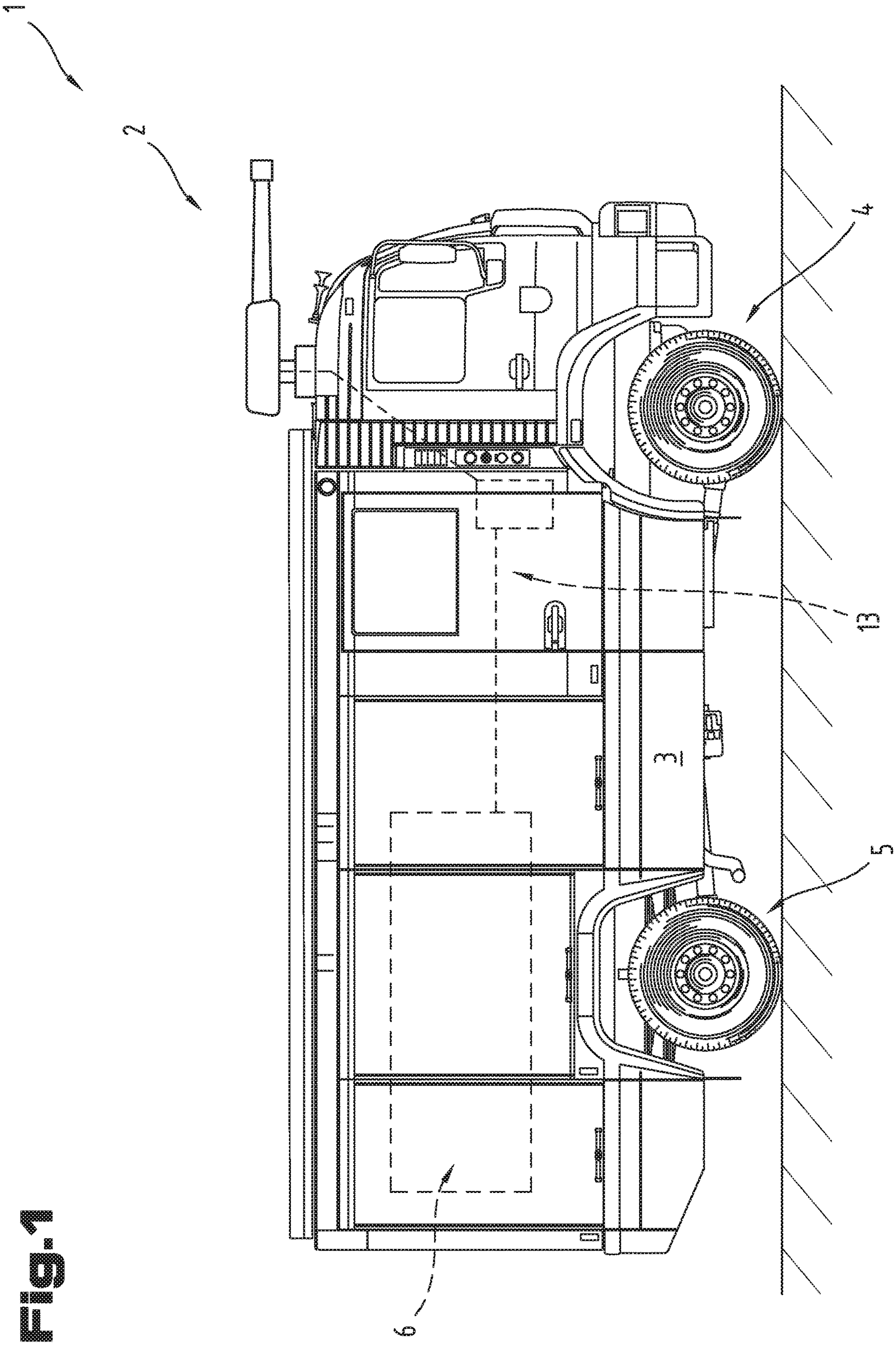

(51) Int. Cl.

| | |
|---|---|
| ***A62C 27/00*** | (2006.01) |
| ***B01F 25/00*** | (2022.01) |
| ***B01F 25/312*** | (2022.01) |

(58) Field of Classification Search

USPC ................................................ 169/14–15, 44

See application file for complete search history.

(56) References Cited

U.S. PATENT DOCUMENTS

| | | | | |
|---|---|---|---|---|
| 9,909,477 | B2 | 3/2018 | Brück et al. | |
| 9,919,172 | B2 | 3/2018 | Stephens et al. | |
| 10,293,196 | B2 | 5/2019 | Hammer | |
| 2004/0020664 | A1 * | 2/2004 | Juidici ..................... | A62C 5/02<br>169/44 |
| 2014/0238703 | A1 * | 8/2014 | Stephens ................ | A62C 27/00<br>73/861.08 |

FOREIGN PATENT DOCUMENTS

| | | | | | |
|---|---|---|---|---|---|
| CH | 703784 | A1 | | 3/2012 | |
| CN | 105121800 | A | | 12/2015 | |
| EP | 2426568 | A1 | | 3/2012 | |
| GB | 1267578 | A | * | 3/1972 | ............ A62C 5/002 |
| GB | 1286049 | A | | 8/1972 | |
| JP | 2003284936 | A | | 10/2003 | |
| JP | 2009005791 | A | | 1/2009 | |
| JP | 2018183242 | A | | 11/2018 | |

OTHER PUBLICATIONS

International Preliminary Report on Patentability for International Patent Application No. PCT/AT2020/060227 dated May 21, 2021, 7 pages.

* cited by examiner

METHOD AND LIQUID MIXING SYSTEM FOR PROVIDING A LIQUID MIXTURE

This application is a bypass continuation of, and claims priority under 35 U.S.C. §§ 120 and 365(c) from, International Application No. PCT/AT2020/060227, filed Jun. 5, 2020, designating the United States, which claims priority to Austrian Patent Application No. A50514/2019, filed Jun. 6, 2019, both of which are incorporated by reference herein.

The field of the present disclosure relates to a method as well as a liquid mixing system for providing a liquid mixture by mixing water with at least one additive.

US 2014/0238703 A1 and AT 513 994 B1 which emerged therefrom each describe a foam test system for a fire engine. In the regard, the accuracy of a foam addition system of the fire engine is tested and, in the course of this, the following method steps are carried out. The foam addition system is operated in a normal mode where a foam concentrate stream flows through a foam metering device and is thereafter mixed with a first tank water flow supplied by a water tank on the vehicle. The foam addition system is operated in a test mode where a test water flow supplied by the water tank flows through the foam metering device and is thereafter mixed with a second tank water flow also supplied by the water tank. During at least a portion of the operation in test mode, the amount of the test water flow flowing through the foam metering device is measured. The disadvantage of this is that a separate examination process for determining the accuracy and functionality of the foam addition system is required.

EP 2 426 568 A1 describes a metering device for admixing additives to a pressurized water flow in a water line with an additive line leading to an additive source, which leads to a water line via a control valve. The desired mixing ratio of the additive to the water can be controlled by the control valve arranged in the additive line. The supplied stream of the additive and, before discharge, the total stream of the mixture of additive and water are each determined by a measuring device, and the signals from the two measuring devices are each fed to a measuring transducer, which outputs signals proportional to the flow rate to the controller. In the event of an interruption during ongoing quenching operation, the supply of additive to the water is interrupted by valves. In order to be able to restore the previously set and desired mixing ratio of additive and water when operation is resumed, a memory device is provided in which the setting values of the control valve are stored. The memory device is operatively connected to a controller for the control valve and can assume setting values for the control valve from the controller or transfer them to the controller. In this way, the step for redetermining the proportioning and pressure difference values in the metering device can be bypassed during a new start-up after an interruption in that the control valve and, if necessary, also the pressure difference valve are immediately returned to the state before the interruption or remain in this state during the interruption.

The present inventors have recognized opportunities to overcome the shortcomings of the prior art and to provide a method and a liquid mixing system for providing a liquid mixture formed by mixing water with at least one additive, by means of which the accuracy and functionality may be determined and observed.

Accordingly, the inventors have devised a method as well as a liquid mixing system for providing a liquid mixture, which is formed by mixing water with at least one additive.

The method serves for providing a liquid mixture by mixing water with at least one additive using a liquid mixing system, in which the following steps are carried out providing a first water reservoir with a first water held therein, providing at least one first additive reservoir with a first additive held therein, providing a mixing unit for admixing at least the first additive to the at least first water comprising an additive flowmeter, an additive metering device and a mixing device, providing a conveying device for conveying at least the first water from the first water reservoir to at least one discharge location, providing a line network comprising

- a feed line, said feed line connecting the first water reservoir with the conveying device,
- a first conveying line, said first conveying line connecting the conveying device with the at least one discharge location,
- a second conveying line, said second conveying line branching off the first conveying line, being connected to the mixing device and further leading back to the conveying device on the entry side,
- an additive line, said additive line connecting the first additive reservoir with the additive metering device and further with the mixing device, and wherein the additive flowmeter is arranged between the first additive reservoir and the mixing device, conveying the first water from the first water reservoir through the first conveying line to the at least one discharge location and further feeding a partial stream through the second conveying line to the mixing device, in which mixing device at least the first additive is admixed to the at least first water and the liquid mixture is fed to the conveying device on the entry side, and wherein it is further provided that at least one first measurement value of at least the flow of the first additive conveyed to the mixing device is determined by the additive flowmeter and the at least one first measurement value is transmitted to a control device, that the total stream of the liquid mixture conveyed to the at least one discharge location by the conveying device is measured by a liquid mixing flowmeter and at least one second measurement value is transmitted to the control device, that the measurement values transmitted to the control device are transmitted to a data storage device and stored therein that a water flowmeter is provided and at least one third measurement value of the water flow passing through the feed line is determined by the water flowmeter in the line extension of the feed line and the at least one third measurement value is also transmitted to the control device, and the at least one third measurement value is also transmitted to the data storage device by the control device and is stored therein, that at least individual ones of the measurement values determined and stored in the data storage device are summarized by the control device in a measurement protocol and are provided, and that an output device is provided, and the output device outputs the measurement protocol created by the control device from the measurement values stored in the data storage device.

The advantage of this approach is that hence, during each operation of the liquid mixing system, the measurement values from the individual flowmeter devices provided for this purpose of the liquid flow or volume flow conveyed and/or flowing through the respective lines are always precisely determined and are additionally transmitted and/or forwarded to the control device. The measurement values transmitted to the control device are transmitted by the latter to a data storage device and stored therein. Thus, in each operation and application of the liquid mixing system, the measurement values collected and/or determined in the course thereof are stored as data sets. By storing and archiving of the individual measurement values, hence, a continuous observation is ensured since the stored data can be referred to for examination purposes.

Moreover, at least one third measurement value of the water flow passing through the feed line is determined by a water flowmeter in the line extension of the feed line and the at least one third measurement value is also transmitted to the control device. By providing a separate water flowmeter, the volume flow and thus the admixing rate of the additive to the water can thus be gathered and determined even more precisely. The water flowmeter thereby determines the water flow passing through the feed line. In this regard, the water can be taken from the first water reservoir and/or from an external discharge location. The entire water flow passing through the feed line is always determined precisely.

It is also provided that the at least one third measurement value is transmitted to the data storage device by the control device and stored therein. By storing these third measurement values, hence, an even more precise subsequent examination and determination of the functionality of the liquid mixing system may be performed.

Moreover, at least individual ones of the measurement values determined and stored in the data storage device are summarized by the control device in a measurement protocol and are provided. By summarizing the gathered measurement values in a measurement protocol and providing them, it is thus possible to provide exact proof of accuracy and functionality for each operating and application case. The data may be provided in electronic form. However, a printout in paper form would also be conceivable.

Lastly, it is provided that an output device is provided, and the output device outputs the measurement protocol created by the control device from the measurement values stored in the data storage device. By the provided output device, hence, an electronic and/or printed output of the measurement protocol of the gathered measurement values and stored data may be created to prove the functionality and accuracy for each case of operation and application of the liquid mixing system.

Moreover, an approach is advantageous according to which the liquid mixing system is integrated in a vehicle body of an emergency vehicle, in particular a fire engine. Since the liquid mixing system is integrated in the vehicle body of the emergency vehicle, thus, additional mobile checking devices may be dispensed with. Hence, in each emergency vehicle, the measurement values determined in the course of this and the stored data can be provided without additional activities.

Another approach is characterized in that the determination of the measurement values is carried out continuously or in predefined time intervals while the liquid mixing system is in operation. Depending on the selected time interval, hence, a continuous or section-wise check of the overall operation of the liquid mixing system may be performed. Thus, deviations and inaccuracies that occur in the short term can also be detected and immediately corrected by appropriate readjustment of the control system.

A further advantageous approach is characterized in that, in addition and/or optionally to the first additive located in the first additive reservoir, at least one second additive is fed to the mixing device. Hence, the possibility of individually providing the required additive for the respective case of application is created. Thus, in the case of application, a quick and individual admixture of the respectively required additive may be enabled. The at least one second additive may also be carried along in the emergency vehicle in a separate additive reservoir provided for this purpose.

A method variant in which the at least one second additive is taken from a second additive reservoir located outside the vehicle body of the emergency vehicle is also advantageous. By providing the second additive reservoir externally outside the vehicle body, the liquid mixture can either continue to be provided when the first additive has already been used up, or an additional, second additive can be mixed into the additive stream.

Another approach is characterized by the fact that in addition and/or optionally to the first water located in the first water reservoir, at least a second water is supplied to the conveying device. This makes it possible to maintain the provision of the liquid mixture when the first water from the water reservoir carried by the emergency vehicle has already been used up.

Moreover, an approach is advantageous in which the at least second water is taken from a discharge location located outside the vehicle body of the emergency vehicle. By the additional discharge location located outside the vehicle body, hence, external water reservoirs may also be used for forming the liquid mixture. Thus, the operation and the associated period of use may additionally be increased.

A further advantageous approach is characterized in that at least a partial stream of the water is branched off the feed line upstream of the conveying device and this partial stream of the water is fed to the additive line and further the removal of the first additive from the first additive reservoir and/or the removal of the second additive from the second additive reservoir is stopped. By the possible feed of at least one partial stream of the water into the additive line, hence, rinsing and cleaning of the additive lines after termination of application may be carried out easily and in a user-friendly manner.

A method variant, in which the control device forms a difference value from a target value of a target additive stream stored in the control device minus the at least one second measurement value determined by the additive flowmeter and depending on the determined difference value, the control device increases or decreases or maintains the feed of the additive by means of the additive metering device, is also advantageous. Hence, by the comparison of target value and actual value, a continuous control of the admixing rate of the additive may be performed for forming the liquid mixture. Hence, different viscosities of the used additives may quickly be reacted to and the correction of the admixing amount may be performed immediately. This applies in particular where an additional additive and/or an additive from another manufacturer is used in the course of application.

The present disclosure also relates to a liquid mixing system for providing a liquid mixture, which is formed by mixing water with at least one additive, the liquid mixing system comprising a first water reservoir for holding a first water, a first additive reservoir for holding a first additive, a mixing unit comprising an additive flowmeter, an additive metering device and a mixing device for admixing at least the first additive to the at least first water, wherein the additive flowmeter is configured for determining a first measurement value of a stream of the first additive to be fed to the mixing device, a conveying device for conveying at least the first water from the first water reservoir to at least one discharge location, a line network comprising a feed line, said feed line connecting the first water reservoir with the conveying device, a first conveying line, said first conveying line connecting the conveying device with the at least one discharge location, second conveying line, said second conveying line branching off the first conveying line, being connected to the mixing device and further leading back to the conveying device on the entry side, an additive line, said additive line connecting the first additive reservoir with the additive metering device and further with the mixing device, and wherein the additive flowmeter is arranged between the first additive reservoir and the mixing device, in which it is further provided that a liquid mixture flowmeter is provided, said liquid mixture flowmeter being configured for determining at least a second measurement value of a total stream of the liquid mixture to be conveyed to the at least one discharge location by the conveying device, that a water flowmeter is provided in the line extension of the feed line, said water flowmeter being configured for determining at least a third measurement value of the water flow flowing through the feed line, that a control device is provided, said control device having a communication connection at least with the additive flowmeter, the liquid mixture flowmeter, the water flowmeter and the additive metering device, that a data storage device is provided, said data storage device having a communication connection with the control device and the data storage device being configured for storing the measurement values transmitted by the control device, and that an output device is provided, and the output device is configured to output the measurement protocol created by the control device from the measurement values stored in the data storage device.

The advantage achieved by this consists in that hence, during each operation of the liquid mixing system, the measurement values from the individual flowmeter devices provided for this purpose of the liquid flow or volume flow conveyed and/or flowing through the respective lines are always precisely determined and are additionally transmitted and/or forwarded to the control device. The measurement values transmitted to the control device are transmitted by the latter to a data storage device and stored therein. Thus, in each operation and application of the liquid mixing system, the measurement values collected and/or determined in the course thereof are stored as data sets. By storing and archiving of the individual measurement values, hence, a continuous observation is ensured since the stored data can be referred to for examination purposes.

Moreover, an output device is provided, said output device being configured to output a measurement protocol created by the control device from the measurement values stored in the data storage device. By the provided output device, hence, an electronic and/or printed output of the measurement protocol of the gathered measurement values and stored data may be created to prove the functionality and accuracy for each case of operation and application of the liquid mixing system.

Moreover, it can be advantageous if the liquid mixing system is integrated in a vehicle body of an emergency vehicle, in particular a fire engine. Since the liquid mixing system is integrated in the vehicle body of the emergency vehicle, thus, additional mobile checking devices may be dispensed with. Hence, in each emergency vehicle, the measurement values determined in the course of this and the stored data can be provided without additional activities. Hence, a unity comprising the liquid mixing system and the emergency vehicle is created.

For the purpose of better understanding of the invention, it will be elucidated in more detail by means of the figures below.

Figure 2:
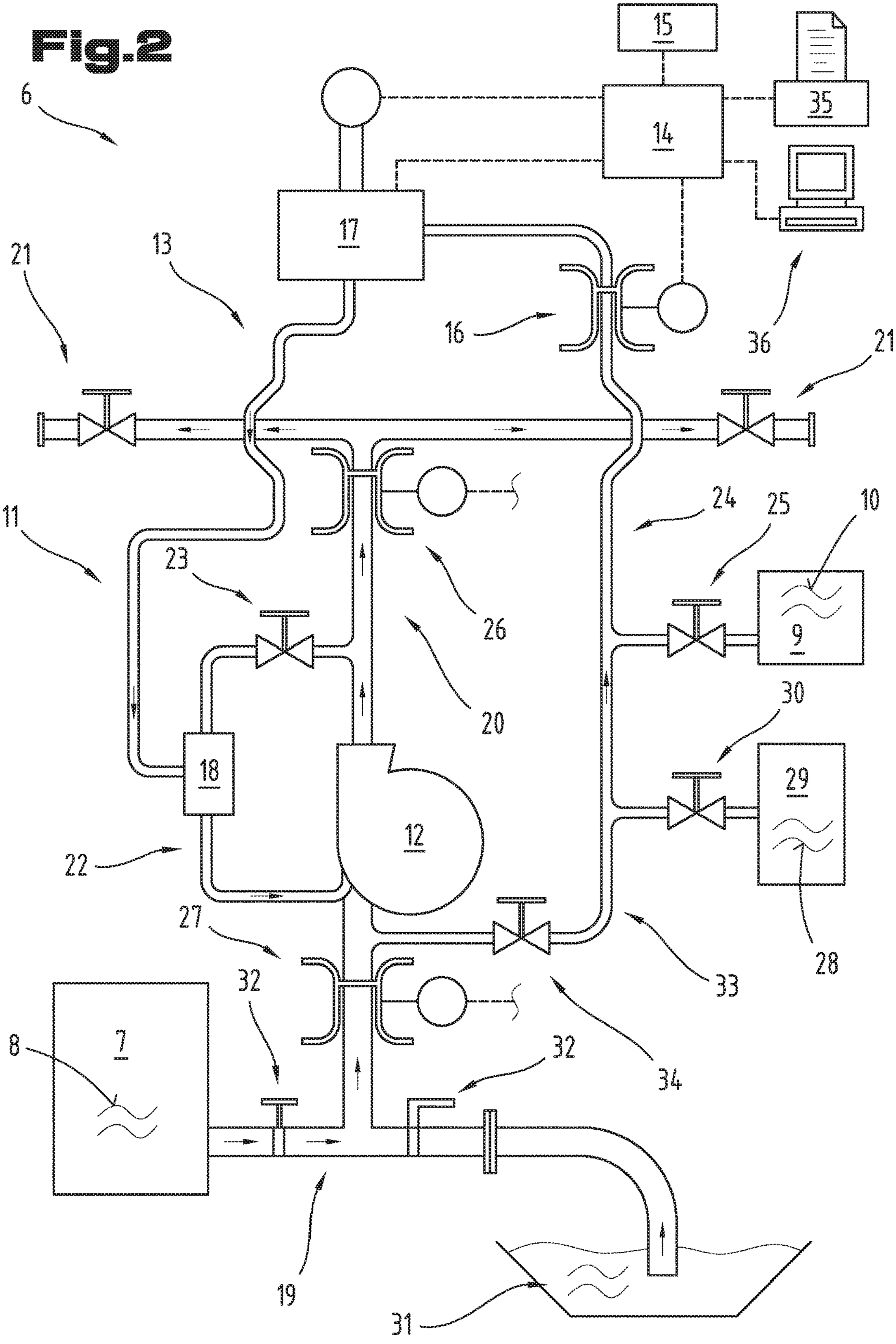

These show in a respectively very simplified schematic representation:

FIG. 1 an emergency vehicle in a lateral view and simplified representation;

FIG. 2 a flow scheme of the liquid mixing system located in the emergency vehicle.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

In their present use, the terms "comprising", "has", "having", "includes", "including", "contains", "containing" and any variations thereof are meant to cover a non-exclusive inclusion.

FIG. 1 shows a stylized view of an emergency vehicle 1, in particular a fire engine, with an emergency aggregate 2 mounted on it. The emergency vehicle 1 comprises a vehicle body mounted on a chassis 3, wherein the shape and the appearance of the emergency vehicle 1 are shown merely by way of example of a plurality of possible designs and shapes. The chassis 3 comprises at least one pair of front wheels 4 and at least one pair of rear wheels 5. To provide a better overview, the representation of drive means was dispensed with.

The vehicle body may also be referred to as vehicle structure, wherein a separate or integrated driver's cabin is also usually provided. As a mobile driving unit, the emergency vehicle 1 comprises a liquid mixing system 6, which is usually integrated in the vehicle body of the emergency vehicle 1. The liquid mixing system 6 serves to provide a liquid mixture by mixing water with at least one additive for purposes of operation. This was merely adumbrated in dashed lines.

In this regard, it should be noted that when the emergency vehicle 1 is designed as a fire engine, it serves mostly for fire-fighting operations. The at least one additive may, in this case, be formed by an extinguishing agent or be referred to as such. Moreover, the generally used term "additive" may, in connection with another component, also be referred to as "extinguishing agent" in the context of the respective component. However, it would also be possible that, for example, a colorant, a liquid decreasing surface tension or the like is used as the additive. This is why general reference is made to an additive which is present in the liquid state.

For extinguishing purposes, the liquid mixing system 6 may also be referred to as the fire extinguishing system. The term "water" generally selected below may also be referred to as extinguishing water in the case of the firefighting vehicle designed as an emergency vehicle.

The further components or component parts associated therewith may be combined with the more specific term "extinguishing water" instead of the general term "water".

In FIG. 2, the liquid mixing system 6, in particular the firefighting system, is shown as a simplified diagram, in particular in the form of a simplified schematic diagram. The components or component parts as well as connecting lines are shown merely in a schematically simplified manner.

The liquid mixing system 6 comprises a first water reservoir 7 for holding a first water 8, a first additive reservoir 9 with a first additive 10 being held therein, a mixing unit 11, a conveying device 12 and a line network 13. Moreover, a control device 14 (e.g. a control system or controller) and a data storage device 15 are provided. The conveying device 12 may be formed by the components known from the prior art, in particular pumps, in diverse designs.

The mixing unit 11 serves for admixing at least the first additive 10 to the at least first water 8. For this purpose, at least one additive flowmeter 16, an additive metering device 17 and a mixing device 18 are provided. The additive flowmeter 16 may be formed, for example, by an electromagnetic flowmeter, an impeller flowmeter or the like.

The line network 13 in turn comprises multiple different lines, which are described below. A feed line 19 connects the first water reservoir 7 to the conveying device 12. Thus, the first water 8 stored in the first water reservoir 7 can be fed to the conveying device 12. Starting from the conveying device 12, a first conveying line 20 is provided, which leads to at least one discharge location 21. The discharge location 21 may serve to be coupled to a hose line not shown. However, a direct further line connection to the emergency aggregate 2 shown in FIG. 1 is also conceivable, which emergency aggregate 2 is designed as a monitor device in the present embodiment. The line connection is adumbrated in dashed lines.

Moreover, a second conveying line 22 is also provided here. The second conveying line 22 forms a type of conveying loop and branches off the first conveying line 20. This takes place downstream of the conveying device 12. Moreover, the second conveying line 22 opens into the mixing device 18 and/or is line-connected to the mixing device 18. Downstream of the mixing device, the second conveying line 22 leads back to the conveying device 12 and opens into it on the entry side. Said entry may also be formed separately from the feed line 19. However, it would also be possible for the second conveying line 22 to open into the feed line 19 upstream of the conveying device 12 as seen in the flowing direction of the water 8 in the feed line 19 and to thus be fluidically connected thereto. Moreover, here, a first valve arrangement 23 is provided in the line extension of the second conveying line 22. The first valve arrangement 23 serves for controlling a flow at least of the first water 8 and/or of the already formed liquid mixture towards the mixing device 18. Hence, it may be determined whether, depending on the conveying circuit in the second conveying line 22, admixing is performed or not. When the first valve arrangement 23 is entirely closes, an admixture of the first additive 10 in the mixing device 18 is stopped.

In order to convey the first additive 10 from the first additive reservoir 9 to the mixing device 18, the line network 13 comprises a separate additive line 24. The flow of the additive 10 through the additive line 24 may be released and/or be stopped entirely or partially depending on the valve position by means of a separate second valve arrangement 25 which is presently shown following the first additive reservoir 9. The additive line 24 connects the first additive reservoir 9 with the additive metering device 17 and opens into the mixing device 18. The mixing device 18 may, for example, be formed by a so-called Venturi nozzle or a so-called propellant valve. The already described additive flowmeter 16 of the mixing unit 11 is also located at or in the additive line 24 and is arranged in the line extension between the first additive reservoir 9 and the mixing device 18. In the present exemplary embodiment, the additive flowmeter 16 is arranged downstream of the first additive reservoir 9 and still upstream of the additive metering device 17.

To allow for the determination of the conveying stream and/or the conveyed amount of the medium conveyed in the conveying line 20 towards the discharge location 21, a liquid mixture flowmeter 26 is provided in the line extension preferably downstream of the connecting point of the second conveying line 22 as seen in the flowing direction. The liquid mixture flowmeter 26 may be formed for example by an electromagnetic flowmeter, an impeller flowmeter or by a flow rate measurement device, as described in AT 514 927 A4. If the conveying device 12 conveys solely water 8 and no admixture of at least one additive 10 is provided for forming the liquid mixture, in particular the extinguishing agent mixture, it is possible that merely the conveying stream and/or the conveyed amount of the water 8 alone is determined by the liquid mixture flowmeter 26.

When the liquid mixing system 6 is in operation and the liquid mixture is to be provided and removed and/or discharged at the discharge location 21 and the valve arrangement/s 23 and/or 25 is/are provided so as to be opened and allow for through-flow. The admixing rate of the additive 10 to the water 8 may be adjusted at the additive metering device 17. For this purpose, for example, during opening and the release of flowing-through of the additive stream by means of the second valve arrangement 25, a target value for the admixing rate of the additive can be transmitted to the control device 14 and further from the latter to the additive metering device 17. The admixing rate of the additive is usually between 0.3% and 10%. However, it would also still be possible, as is shown in simplified manner next to the control device 14, to provide an input terminal or an input device 36 which has a communication connection at least with the control device 14. The input device 36 serves for manually specifying and entering the target value of the admixing rate by an operator, but it could also be used to correct a target value that has already been specified.

During operation of the conveying device 12, the water 8 is removed, in particular drawn, from the first water reservoir 7. When a removal is performed at the discharge location 21, the water 8 is first conveyed into the first conveying line 20 and by release of the flow connection by the first valve arrangement 23 the supply towards the mixing device 18 is enabled. There, admixture of at least the first additive 10 is performed. The liquid mixture, in particular the extinguishing agent mixture, formed or produced in the course of this is fed to the conveying device 12 at the entry side and is conveyed from the latter to the discharge location 21. A partial stream is, in turn, branched off from the first conveying line 20 and fed to the second conveying line 22.

At least one first measurement value of at least the flow of the first additive 10 conveyed to the mixing device 18 is determined by the additive flowmeter 16. The at least one first measurement value is transmitted to the control device 14. Moreover, the total stream of the liquid mixture, in particular the extinguishing agent mixture, conveyed to the at least one discharge location 21 by the conveying device 12 is determined by the liquid mixture flowmeter 26 and at least one second measurement value is generated. The at least one second measurement value is also transmitted to the control device 14. The communication connection to the control device 14 is adumbrated by a dashed line.

In further consequence, it is provided that the measurement values transmitted to the control device 14 are transmitted further to the data storage device 15. To transmit the measurement values representing data and/or measurement data, the components described above have a communication connection. The communication connection may be designed so as to be line-connected and/or wireless.

It may also be provided that a water flowmeter 27 is also arranged in the line extension of the feed line 19, wherein the water flowmeter 27 is designed to determine at least a third measurement value of the water flow streaming through the feed line 19. The water flowmeter 27 may also be formed, for example, by an electromagnetic flowmeter, an impeller flowmeter or the like. Hence, the water flowmeter 27 can determine at least a third measurement value of the water flow removed from the first water reservoir 7, wherein the at least one third measurement value can also be transmitted to the control device 14. The at least one third measurement value may also be transmitted to the data storage device 15 by the control device 14 and stored therein. The communication connection from the water flowmeter 27 to the control device 14 is also adumbrated by a dashed line.

The determination of the measurement values described above may be performed continuously or in predetermined time intervals while the liquid mixing system 6 is in operation. Hence, the proper functioning of the liquid mixing system 6 may be ascertained at any time.

The control device 14 may also be designed or provided for the measurement values stored in the data storage device 15 to be summarized and provided in a measurement protocol by the control device 14. The measurement protocol created can be output, e.g. printed out, at an output device 35 shown in a simplified manner. In addition to or independently of this, the measurement values or the measured data could also be transmitted in electronic form to an external storage medium, such as a USB stick. Hence, for each operation of the liquid mixing system 6, a functionality protocol may be created from the measurement values and be output. Thus, the correct function of the liquid mixing system 6 may be determined after each operation or use and can also be proven and/or documented by means of the measurement protocol.

Furthermore, it is also shown that in addition and/or optionally to the first additive 10 located in the first additive reservoir 9, at least one second additive 28, in particular a second foaming agent, can be fed to the mixing device 18. For this purpose, the at least one second additive 28 can be stored, for example, in a second additive reservoir 29, in particular a second foaming agent reservoir, located outside the vehicle body of the emergency vehicle, in particular outside the firefighting vehicle, and can be removed from this reservoir as required. To release or stop the flow connection here as well, a third valve arrangement 30 may be provided which prevents or releases a flow from the first additive reservoir 29 into the additive line 24. It would also be possible to arrange the at least one second additive reservoir 29 inside the emergency vehicle 1. Additionally to this, at least one further external further additive reservoir 29 may be provided.

It may also be provided that additionally and/or optionally to the first water 8 located in the first water reservoir 7, at least one second water 31, in particular a second extinguishing water, is fed to the conveying device 12. In this regard, the second water 31 may be removed from a discharge location located outside the vehicle body of the emergency vehicle. The discharge location may, for example, be an external water supply network, a body of water, a pool or the like. In order to enable an optional supply of the water 8, 31 to the conveying device 12, separate shut-off members 32 can be provided in the feed line 19.

For cleaning or rinsing purposes, an additional line connection can be provided branching off from the feed line 19 to the conveying device 12 to the additive line 24. This line connection can be referred to as a rinsing line 33, wherein the shut-off or release of the flow of the water 8, 31 can take place by means of a fourth valve arrangement 34. Thus, the possibility is created to branch off at least a partial stream of the water 8, 31 upstream of the conveying device 12 from the feed line 19 and to feed this water flow to the additive line 24. In order to prevent an undesired admixture of the additive 10 and/or 28 from one of the additive reservoirs 9, 29 the second valve arrangement 25 as well as the third valve arrangement 30 are to be closed. This prevents the removal of the first additive 10 from the first additive reservoir 9 and/or the removal of the second additive 28 from the second additive reservoir 29.

During the rinsing process of the additive line 24, the conveying device 12 is in operation and the water 8, 31 is drawn in via the feed line 19. The first valve arrangement 23 is open, just as in the admixing operation, and a partial stream of the water 8, 31 is fed to the mixing device 18. As previously described for the cleaning or rinsing process, the second valve arrangement 25 as well as the third valve arrangement 30 for the additive(s) 10, 28 are closed and the fourth valve arrangement 34 in the rinsing line 33 is open. Due to the vacuum built up in the mixing device 18 or by the mixing device 18, an additive is drawn in through the additive line 24, which in this case is "water" since the fourth valve arrangement 34 is open. The water forming the additive 8, 31 is branched off of the feed line 19.

In order to precisely set and control the metering rate of the additive 10, 28 a difference value can be formed by the control device 14 from a target value of an additive target flow stored in the control device 14 or entered by means of the input device 36 minus the at least one first measurement value determined by the additive flowmeter 16. Depending on the difference value determined by the control device 14, the supply of the additive 10, 28 by means of the additive metering device 17, is increased or decreased or kept unchanged. This can be carried out, for example, by means of an unspecified actuator which has a communication connection with the control device 14. The actuator can change the admixing rate, wherein this is also to be controlled and adjusted depending on the second measurement value, determined by the liquid mixture flowmeter 26 of the total stream of the liquid mixture, in particular of the extinguishing agent mixture, conveyed to the discharge location 21.

It is possible to use diverse additives 10, 28. The used additive 10, 28 or the used additives 10, 28 may be selected depending on the conditions of use. Moreover, the additive 10, 28 may also originate from diverse manufacturers. Hence, each additive will have its own viscosity. Irrespective thereof, the temperature of use also has an impact on the viscosity. By the continuous determination of the measurement values, hence, the admixing rate and/or the admixing amount of the at least one additive 10, 28 can be precisely controlled and by provided in the predetermined amount for admixing into the water 8, 31 by the additive metering device 17. Thus, during operation, this open-loop control and closed-loop control option allows for a rapid response to changing operating conditions. This is not possible in previously known metering systems with predetermined orifice dimensions for the flow cross-section and ball valves.

In the previously described measurement by means of flowmeters, the volume flow (or more inaccurately the flow rate) is measured as a physical quantity of fluid mechanics. It specifies how much volume of a medium per time span is transported through a defined cross-section.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A method for providing a liquid mixture by mixing water with at least one additive using a liquid mixing system, comprising the following steps:

providing a first water reservoir with a first water held therein, providing at least one first additive reservoir with a first additive held therein, providing a mixing unit for admixing at least the first additive to the at least first water, the mixing unit comprising an additive flowmeter, an additive metering device and a mixing device, providing a pump for conveying at least the first water from the first water reservoir to at least one discharge location, providing a line network comprising:

a feed line, said feed line connecting the first water reservoir with the pump, a first conveying line, said first conveying line connecting the pump with the at least one discharge location, a second conveying line, said second conveying line branching off the first conveying line, being connected to the mixing device and further leading back to the pump on an entry side thereof, an additive line, said additive line connecting the first additive reservoir with the additive metering device and further with the mixing device, and wherein the additive flowmeter is arranged between the first additive reservoir and the mixing device, conveying the first water from the first water reservoir through the first conveying line to the at least one discharge location and further feeding a partial stream through the second conveying line to the mixing device, in which mixing device at least the first additive is admixed to the at least first water and the liquid mixture is fed to the pump on the entry side, wherein:

at least one first measurement value of at least a flow of the first additive conveyed to the mixing device is determined by the additive flowmeter and the at least one first measurement value is transmitted to a controller, a total stream of the liquid mixture conveyed to the at least one discharge location by the pump is measured by a liquid mixing flowmeter and at least one second measurement value of the total flow of the total stream of the liquid mixture conveyed to the at least one discharge location is transmitted to the controller, the first and second measurement values are transmitted to a data storage device and stored therein, a water flowmeter is provided and at least one third measurement value of water flowing through the feed line is determined by the water flowmeter and the at least one third measurement value is also transmitted to the controller, and the at least one third measurement value is also transmitted to the data storage device and is stored therein, at least some of the first, second, and/or third measurement values are summarized in a measurement protocol, and outputting the measurement protocol to an operator of the liquid mixing system.

2. The method according to claim 1, wherein the liquid mixing system is integrated in a vehicle body of an emergency vehicle.

3. The method according to claim 2, wherein the emergency vehicle is a fire engine.

4. The method according to claim 2, further comprising: feeding at least one second additive to the mixing device, and wherein the at least one second additive is taken from a second additive reservoir located outside the vehicle body of the emergency vehicle.

5. The method according to claim 4, wherein the emergency vehicle is a fire engine.

6. The method according to claim 4, wherein at least a second partial stream of the water is branched off the feed line upstream of the pump and this second partial stream of the water is fed to the additive line and further the removal of the first additive from the first additive reservoir and/or the removal of the second additive from the second additive reservoir is stopped.

7. The method according to claim 2, further comprising: supplying at least a second water to the pump.

8. The method according to claim 7, wherein the second water is taken from a discharge location located outside the vehicle body of the emergency vehicle.

9. The method according to claim 1, wherein the determination of the first, second, and third measurement values is carried out continuously or in predefined time intervals while the liquid mixing system is in operation.

10. The method according to claim 1, further comprising: feeding at least one second additive to the mixing device.

11. The method according to claim 1, wherein the controller determines a difference value from a target value of a target additive stream stored in the controller minus the at least one first measurement value determined by the additive flowmeter and depending on the determined difference value, the controller increases or decreases or maintains a feed of the first additive to the mixing device by means of the additive metering device.

12. A liquid mixing system for providing a liquid mixture, which is formed by mixing water with at least one additive, the liquid mixing system comprising:

a first water reservoir for holding a first water, a first additive reservoir for holding a first additive, a mixing unit comprising an additive flowmeter, an additive metering device and a mixing device for admixing at least the first additive to the at least first water, wherein the additive flowmeter is configured for determining a first measurement value of a stream of the first additive to be fed to the mixing device, a pump for conveying at least the first water from the first water reservoir to at least one discharge location, a line network including:

a feed line, said feed line connecting the first water reservoir with the pump, a first conveying line, said first conveying line connecting the pump with the at least one discharge location, a second conveying line, said second conveying line branching off the first conveying line, being connected to the mixing device and further leading back to the pump on an entry side thereof, an additive line, said additive line connecting the first additive reservoir with the additive metering device and further with the mixing device, and wherein the additive flowmeter is arranged between the first additive reservoir and the mixing device, a liquid mixture flowmeter configured for determining at least a second measurement value of a total stream of the liquid mixture to be conveyed to the at least one discharge location by the pump, a water flowmeter configured for determining at least a third measurement value of the water flow flowing through the feed line, a controller having a communication connection at least with the additive flowmeter, the liquid mixture flowmeter, and the water flowmeter, the controller configured to receive the first, second and third measurement values from the respective additive flowmeter, liquid mixture flowmeter, and water flowmeter;

a data storage device having a communication connection with the controller and the data storage device being configured for storing the first, second, and third measurement values, and wherein the controller is configured to summarize at least some of the first, second, and/or third measurement values stored in the data storage device to create a measurement protocol that is accessible by an operator of the liquid mixing system.

13. The liquid mixing system according to claim 12, wherein the liquid mixing system is integrated in a vehicle body of an emergency vehicle.

14. The liquid mixing system according to claim 13, wherein the emergency vehicle is a fire engine.

15. The liquid mixing system of claim 12, further comprising a communication connection between the controller and the additive metering device, and wherein the controller is configured to control the additive metering device to increase, decrease, or maintain a feed of the first additive to the mixing device.

16. The liquid mixing system of claim 15, wherein the controller is further configured to control the additive metering device based on a difference value determined by the controller from a target value of additive minus the at least one first measurement value determined by the additive flowmeter.

17. The liquid mixing system of claim 15, further comprising a second additive reservoir for holding a second additive, the second additive reservoir connected with the additive line to thereby feed the second additive to the mixing device.

* * * * *